C. A. PARSONS AND A. H. LAW.
MEANS FOR DETECTING OR MEASURING MOISTURE.
APPLICATION FILED JULY 10, 1918.
1,383,233.
Patented June 28, 1921.
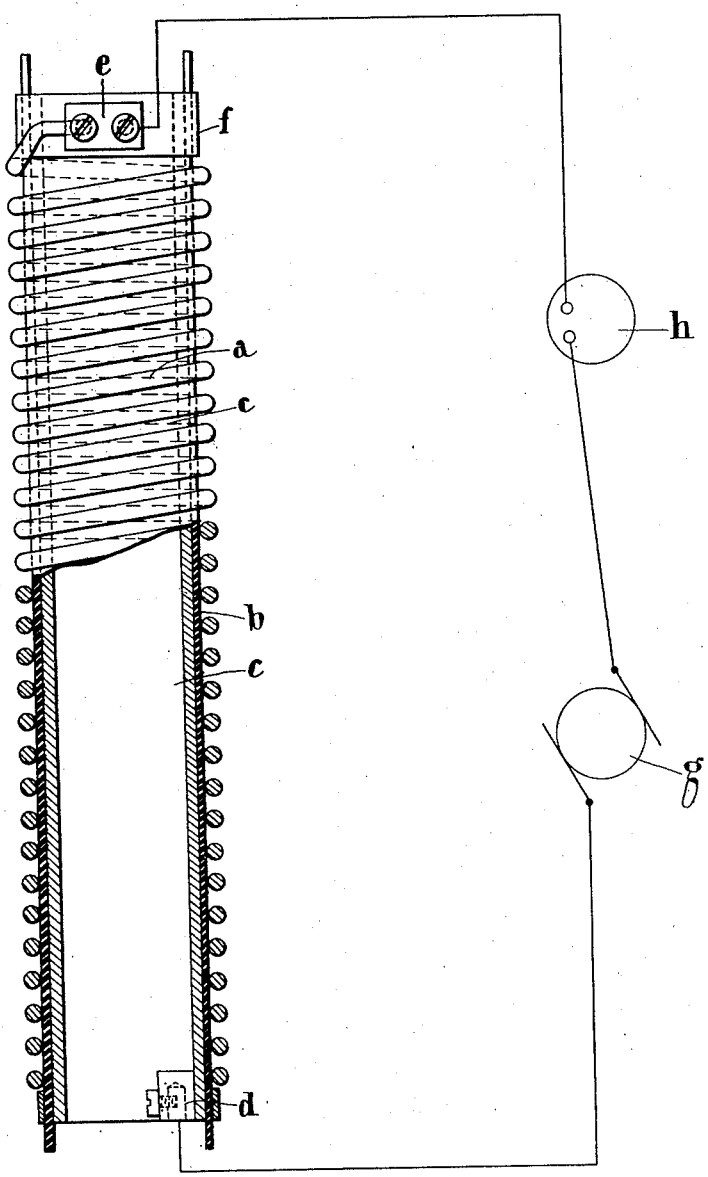
Inventors:
Charles A. Parsons,
Alexander H. Law,
by Spear, Middleton, Donaldson & Spear Attys.

UNITED STATES PATENT OFFICE.

CHARLES ALGERNON PARSONS AND ALEXANDER HENRY LAW, OF NEWCASTLE-UPON-TYNE, ENGLAND; SAID LAW ASSIGNOR TO SAID PARSONS.

MEANS FOR DETECTING OR MEASURING MOISTURE.

1,383,233.  Specification of Letters Patent.  Patented June 28, 1921.

Application filed July 10, 1918. Serial No. 244,264.

*To all whom it may concern:*

Be it known that we, CHARLES ALGERNON PARSONS and ALEXANDER HENRY LAW, both subjects of the King of Great Britain and Ireland, and both residing at Heaton Works, Newcastle-upon-Tyne, in the county of Northumberland, England, have invented a certain new and useful Improved Means for Detecting or Measuring Moisture, of which the following is a specification.

In the design of large turbo alternators in which a large quantity of air has been used for cooling purposes, it has lately been customary to cool and clean this air by means of water sprays or by passing the air through chambers of various sorts where it comes into contact with water in a finely divided state. These various devices have proved satisfactory for the purposes desired, but considerable difficulty has been encountered in certain instances owing to suspended moisture being carried over with the air and deposited in the windings of the alternator.

It has been a difficult matter to discover the presence of this water because owing to variations in the working conditions and in the temperatures of the air and of the alternator itself, it has been found that considerable variations in the amount of moisture carried over occur at different times.

It is not possible while electrical windings are in use to investigate the condition of the insulation by measuring the insulation resistance. In order to do this it is usually necessary to stop the machine and to disconnect the cables connecting it with the switchboard. Some method is therefore desirable by which the presence of moisture harmful to electrical insulation may be very rapidly detected, and this invention is intended to provide a means for detecting such moisture.

The invention consists in detecting or measuring moisture in air by means of the effect produced by moisture on the resistance of insulating material.

The invention also consists in the application of a hygrometer whose action depends on the varying resistance of insulating material to the detection or measurement of moisture in the air employed for cooling alternators or other electrical machinery.

The invention further consists in the improved means for detecting or measuring moisture hereinafter described.

According to this invention as applied in one form, a piece of insulating material, such as presspahn or leatheroid, is wound around a metal cylinder. Outside this insulating material is wound a coil of metal wire which is insulated by the insulating material from the metal cylinder. This apparatus is suspended in the air ducts between the water filter and the alternator and readings are taken of the insulation resistance between the outer wire and the inner cylinder. It has been found that such an apparatus is very sensitive indeed to the type of very finely divided moisture which has a detrimental effect on the insulation of electrical windings.

The testing coil described above would be employed in detecting the presence of moisture in the atmosphere by connecting it in series with a source of electrical potential and with an indicating instrument, such as an ohmmeter or microammeter.

It will be clear that any form of insulating element may be used other than that described above, it being only necessary that the insulation used shall be of such a nature as to respond rapidly and definitely to variations in the moisture contained in the air.

The device may also be applied for measuring the moisture contained in air in applications other than that of electrical machinery, but in the case of electrical machinery the arrangement is peculiarly valuable since, if desired, the nature of the insulation used on the sample may be the same as that used in the windings of the alternator.

Referring to the accompanying drawings:—

The figure shows a part section and an outside view of a detector constructed according to the invention.

In the form of the invention shown there is provided a coil of wire $a$, preferably Eureka, or other non-corrodible metal wound over the insulating material $b$ such as presspahn, tape or the like, such materials being chosen as are sensitive to free moisture in the surrounding air. The insulating material $b$ and coil $a$ are wound on a metal tube $c$ which may conveniently be made of tinned brass. The terminal $d$ is connected to the tube $c$ and a similar terminal $e$ is connected to the outer wire $a$. This latter terminal is firmly secured by means of an additional strap of metal $f$ connected around the outside of the insulating material and insulated from the inner tube $c$.

In using the instrument the terminals $d$ and $e$ are connected in series with a source of electrical potential, such as a dynamo $g$, and an indicating instrument, such as an ohmmeter or microammeter $h$. Under these conditions the reading of the instrument $h$ will vary with the resistance of the insulating material $b$ and since this resistance alters according to the amount of moisture in the surrounding atmosphere the reading of the instrument $h$ varies with the moisture in the atmosphere. The instrument may, in fact, be calibrated to give an indication directly of the amount of moisture present.

Having now described our invention, what we claim as new and desire to secure by Letters Patent is:—

A device for indicating the presence of moisture in air or gases comprising a metal cylinder having its curved surface covered with a material the electrical insulation resistance of which varies with the amount of moisture in the surrounding atmosphere, a coil of bare wire wound around the insulating material, and terminals connected respectively to the metal cylinder and to the wire coil, substantially as described.

In testimony whereof we have signed our names to this specification.

CHARLES ALGERNON PARSONS.
ALEXANDER HENRY LAW.